Sept. 21, 1971  P. C. WHITENER  3,606,978
WING SWEEP PIVOT-BEARING ARRANGEMENT
Filed Oct. 16, 1969  4 Sheets-Sheet 1

INVENTOR:
PHILIP C. WHITENER
BY
Christensen, Sanborn & Matthews
ATTORNEYS

Sept. 21, 1971  P. C. WHITENER  3,606,978
WING SWEEP PIVOT-BEARING ARRANGEMENT
Filed Oct. 16, 1969  4 Sheets-Sheet 2
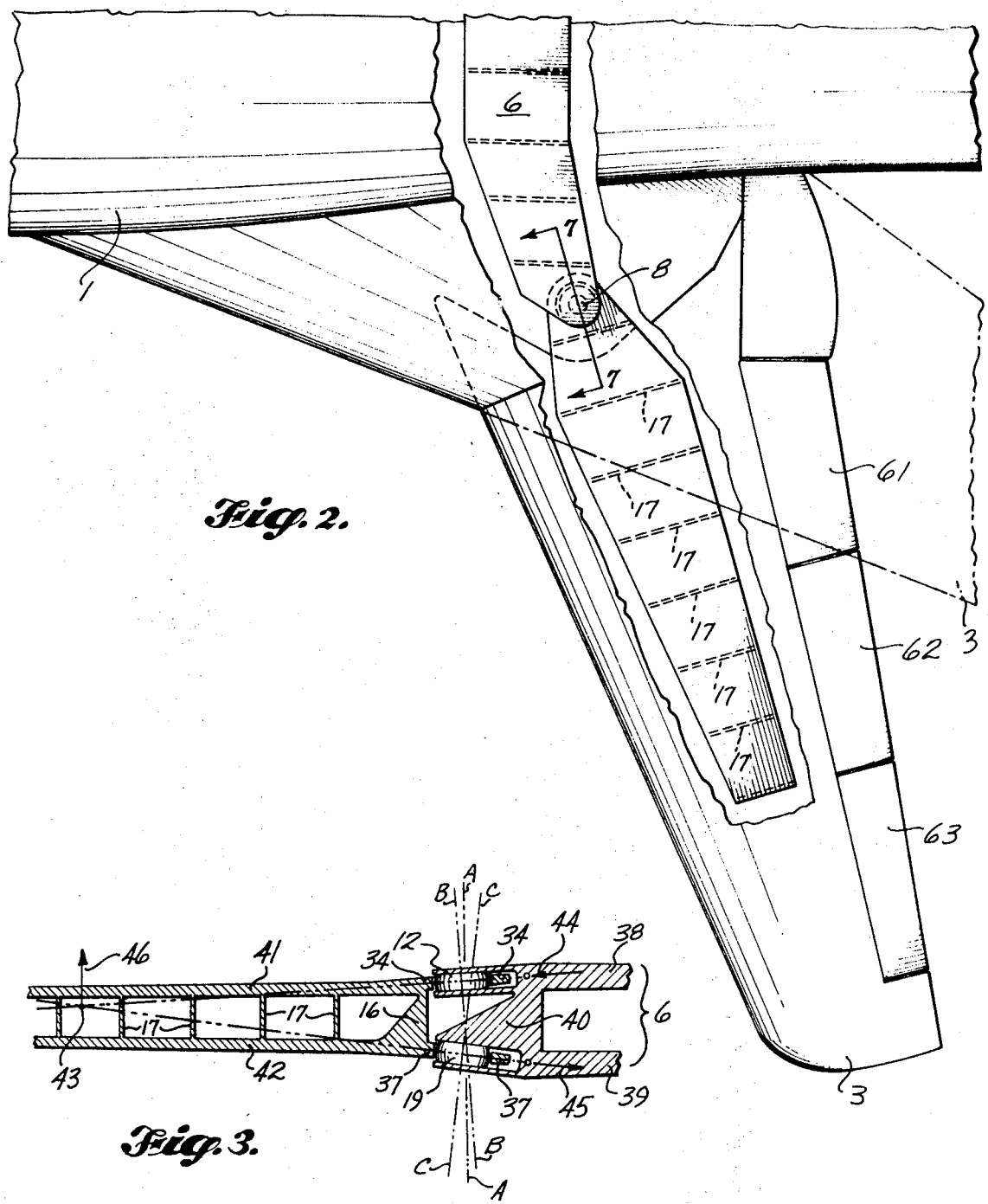
INVENTOR:
PHILIP C. WHITENER
BY
Christensen, Sanborn & Matthews
ATTORNEYS INVENTOR:
PHILIP C. WHITENER
BY
Christensen, Sanborn & Matthews
ATTORNEYS

United States Patent Office 3,606,978
Patented Sept. 21, 1971

3,606,978
WING SWEEP PIVOT-BEARING ARRANGEMENT
Philip C. Whitener, Seattle, Wash., assignor to The Boeing Company, Seattle, Wash.
Filed Oct. 16, 1969, Ser. No. 866,867
Int. Cl. B64c 3/40
U.S. Cl. 244—46                13 Claims

ABSTRACT OF THE DISCLOSURE

An aircraft having movable wings with a wing pivot apparatus which eliminates major axial forces on the bearings is described. Two spherical bearings are utilized for each wing with the spherical bearings having their center on the pivot axis of the wing. The bearings are oriented with their norminal axes noncoincident with the pivot axis of the wing so that a plane passing through the center of the upper bearing perpendicular to the nominal axis thereof will intersect a plane passing through the center of the lower bearing perpendicular to its nominal axis at the approximate center of lift of the wing. The pivot bearing design reduces axial forces and present essentially only radial shear forces upon the individual bearing elements. The wing pivot apparatus is preloaded to prevent loosening of the bearing apparatus during normal operational use of the aircraft. The bearings permit any necessary thermal expansion of the wing pivot apparatus and are covered with a low-friction polymeric material to improve bearing life and decrease friction.

FIELD OF THE INVENTION

This invention relates to airplanes having aerodynamic surfaces pivotally adjustable in a sweep and more particularly relate to an improved pivot bearing arrangement which reorients the structural stress loads imposed on the support structure through the pivot bearing housing as a result of the aerodynamically imposed flight loads to essentially eliminate all but radial shear forces on the bearing members.

OBJECTIVES OF THE INVENTION

It is a broad object of this invention to provide a variable-sweep wing bearing apparatus suitable for use in aircraft operating at both subsonic and supersonic speeds to permit efficient operation and facilitate movement of the variable-sweep wing to any of its operable positions in flight.

A further object hereof is to devise a movable wing support bearing apparatus which permits operation of a swept wing aircraft with the variable sweep wing located in any of its swept positions without undue axial forces on the bearing surfaces. A related object is to provide a low-frictional bearing apparatus for use in the movable wing support of supersonic aircraft.

A further object hereof is to provide a reliable wing pivot bearing system.

One additional object hereof is to decrease the complexity of the wing pivot apparatus required for sweep wing aircraft. A related object is to decrease the weight of the sweep wing pivot bearing arrangement.

An important object of this invention is to provide a sweep wing bearing pivot for aircraft which permits the control equipment, utilities and systems which link the fuselage with the functional elements of the wing to operate at any angle of wing sweep.

SUMMARY OF THE INVENTION

With the advent of variable sweep wing configurations for airplanes and the decreased air foil thickness of aerodynamic surfaces necessary for sustained high-speed flight it becomes necessary to provide for a pivot bearing arrangement which is capable of transferring the large flight loads imposed on the pivotally adjustable wing surfaces to the fuselage with adequate structural rigidity to avoid flutter and sufficient strength to safely operate the aircraft in all positions of the sweep-wing surfaces. Further the imposed flight loads must be carried structurally in such a manner that unreasonably high stresses are not induced by either structural deflection or thermal effects.

Generally, prior attempts to solve this problem have resulted in pivot bearing configurations that occupied too much space and were unreasonably heavy, complex and unreliable.

In this invention a wing pivot bearing arrangement is provided in which the effective loading in the upper structural members of the wing is fed into the upper bearing and the effective loading in the lower structural members of the wing is fed into the lower bearing. One of the bearings is arranged so that minor translation due to thermal expansion is permitted in a direction parallel to the wing pivot axis without hampering operation. The bearings react to radial loads and are canted in such a way that normally no shear forces are imposed upon the bearings.

The lift forces from the wings are transferred across the wing pivot by converting them into the radial resultant at the bearing.

The wing pivot apparatus comprises two bearings, at least one of which is a spherical type to permit rotational movement of the bearing race in a plane other than that perpendicular to the wing pivot. The bearings are canted with their nominal axis noncoincident with the wing pivot axis. This configuration thus requires a spherical bearing or its equivalent to permit rotation of the wing about its pivot axis. The bearings are oriented so that planes passing through the center of each bearing perpendicular to the nominal axis of the bearing will intersect at the approximate center of lift or center of pressure of the aircraft wing. With this configuration, the normally encountered forces observed in flight may be transmitted to the fuselage of the plane exclusively in their radial components through the wing pivot.

In passing from subsonic to supersonic speeds and when the orientation of the wings is altered by the pilot, spanwise excursions of the center of lift will occur. Significant excursions will occur due to differences in the flight characteristics of the wing at subsonic and supersonic speeds and at the various wing sweep positions. To accommodate such excursions, the wing pivot assembly must be constructed so that the excursions of the center of lift may occur without incurring a resulting unacceptablt shear force upon the bearing mounts. When significant excursions of the spanwise center of pressure occur all the shear forces will not be carried by the radial loads in the bearings. In this event the residual shear forces are carried through the spherical bearing into a shear resistant structure in both the movable and fixed part of the pivot assembly.

The bearings are coated with a surface of a Teflon-type fabric to provide a low-friction highly wear-resistant bearing surface. The Teflon-type fabric is bonded to the bearing race. The bearing race rotates on a hard metallic inner member. These bearings have excellent characteristics in that they possess an extremely high load rating, are impervious to moisture, oil, ice or the effects of temperature or age. The bearings are installed in a preloaded condition which substantially eliminates the possibility of any free play developing during the operating life of the airplane. The high preload increases the effective stiffness of the joint appreciably and considerably extends the fatigue life.

THE DRAWINGS

FIG. 2 shows a plan view of one wing of the aircraft depicted in FIG. 1 having the upper skin of the wing and adjacent fuselage removed.

FIG. 3 shows an elevation view of one embodiment of the pivot arrangement of this invention with the usually encountered force vectors superimposed thereon.

Figure 1:
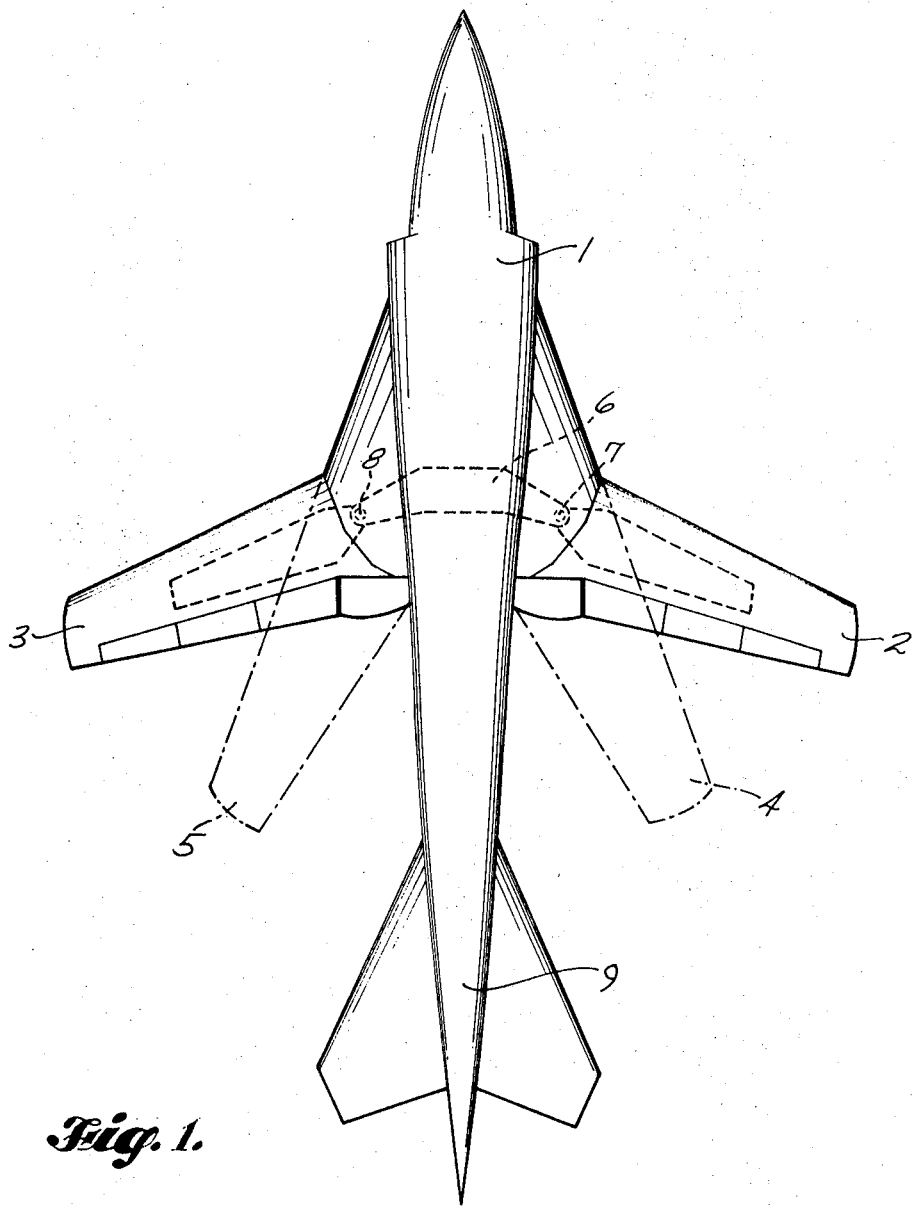
FIG. 1 shows a plan view of a movable wing aircraft using the device of this invention.

Referring more particularly to the drawings, in FIG. 1 a swept-wing aircraft having a fuselage 1 and a tail section 9 is shown with the wings 2 and 3 extended in their open position shown in the heavy lines in the drawing. Shown at 4 and 5 in outline are the wings in their swept position. A wing yoke 6 carrying a pair of wing pivots 7 and 8 is shown in dotted lines in its position in the plane. The wings are constructed and arranged to pivot about points 7 and 8 from a first open position to a second closed position or to be placed at any intermediate location during flight. In FIG. 2 one wing of the swept-wing aircraft is shown in somewhat more detail. The wing 3 is shown in its open or extended position which may be pivoted about the pivot point 8. The wing yoke 6 is shown extending through and connecting to the fuselage 1 of the aircraft. Control surfaces 61, 62 and 63 along the trailing edge of the wing are utilized to control the flight of the craft. Additional control surfaces along the leading and trailing edges may be provided if desired. Wing cross members 17 are provided to add strength and stability to the wing.

FIG. 3 shows a schematic cross-sectional representation of the airplane wing in flight showing the various forces acting upon the bearing system provided by this invention. The average center of lift is shown at 43. The wing is designed such that the structural members in the wing at the wing pivot A—A contain only forces perpendicular to the nominal axis of each bearing; no shear component is normally imposed upon the bearings. The term "nominal axis" is defined for use herein as the axis of the spherical bearing which extends perpendicular to the mounting surface or equivalent structure of the spherical segment. Thus in FIG. 3 the nominal axis of bearing 12 is indicated by the line B—B. Bearing 19 has a nominal axis indicated by the line C—C. In the situation in which a cylindrical bearing or bearing race is used, as is further pointed out below, the nominal axis will coincide with the axis of rotation of the cylindrical bearing.

The spherical bearings permit rotation of the wing about the pivot while the plane is in flight without the shear forces normally encountered by wing pivot bearing apparatus. The two spherical bearings 12 and 19 are carried by the wing bearing yoke 6 which is made up of an upper wing support 38, a lower wing support 39 and a shear web 40. The upper and lower wing supports 38 and 39 extend into and are connected to the fuselage of the airplane and transmit the lift forces to the fuselage.

In flight, the lift vector 46 is separated into it's components shown as vectors 44 and 45 which are carried by the upper and lower bearings respectively. The bearing apparatus of this invention is designed such that in the usual situation, the force vectors 44 and 45 act radially upon the bearing structure without a shear component being present. To operate effectively, the bearings of the pivot A—A must be constructed and arranged so that a plane which passes through the center of lift 43 and the center of the spherical bearing must intersect the spherical segment of the bearing on a load bearing surface for all positions of the wings.

Figure 4:
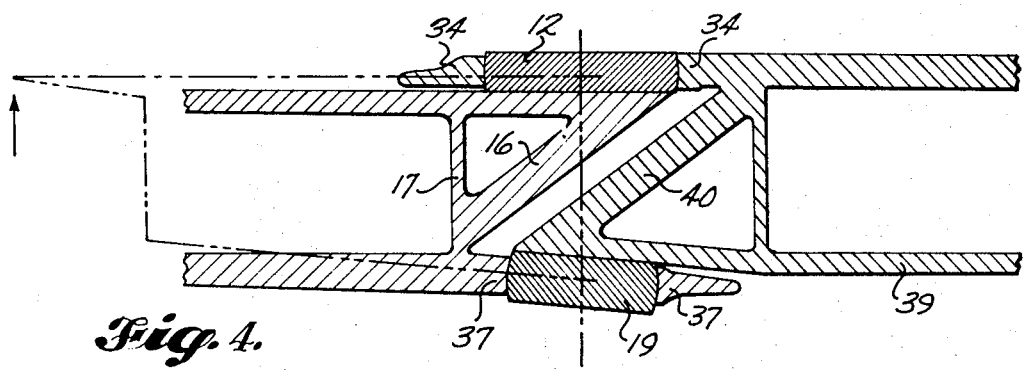
FIG. 4 shows a cross section through the wing pivot of one embodiment of the sweep wing pivot arrangement of this invention.

FIG. 4 shows an embodiment of this invention which is suitable for a pivot requiring aerodynamic smoothness both above and below the wing and which requires a minimum thickness inboard of the pivot. In this embodiment, two spherical bearings 12 and 19 are used, each spherical bearing being supported from one side only. Bearing 12 is supported by a structural member of the movable portion of the wing with the bearing race 34 supported by and attached to the upper wing support 38. The lower spherical bearing is connected firmly to the lower wing support 39 and to the shear web 40 which receives any minor shear forces transmitted through the bearing due to migration of the center of pressure or lift on the wing surface. The corresponding bearing race 37 is attached to the movable part of the wing. The smaller diameter spherical bearing 19 is used as the lower bearing to absorb minor shear forces imposed across the wing pivot. The shear forces result from migration of the center of pressure or lift on the aircraft wing which occurs as the wing sweep angle is altered and in changing from subsonic to supersonic speeds.

Figure 5:
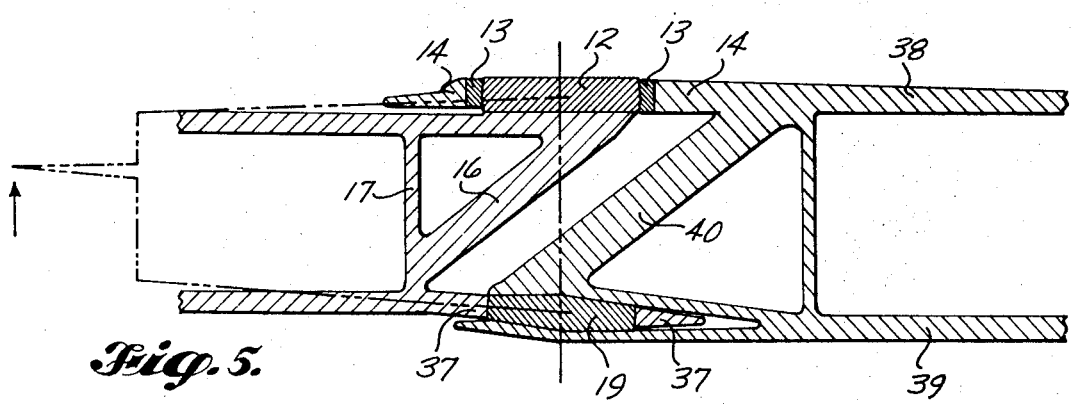
FIG. 5 shows a cross section through the wing pivot of a second embodiment of this invention.

In FIG. 5 an embodiment similar to that shown in FIG. 4 is detailed with a modified lower bearing assembly which provides a dual load path for the lower spherical bearing. Such a configuration is useful in applications in which the wing thickness is not a critical factor and high strength due to heavy loading of the pivot is a necessary design factor. In this embodiment, a bearing structure having the advantages of both the cylindrical type bearing and the spherical type bearing is used for the upper bearing 12. A duplex bearing race is shown in which the inner race 13 has a spherical inner surface and a cylindrical outer surface. The outer cylindrical race 14 encircles the inner race 13 and in turn is connected to the wing supports. This type of bearing race permits a small amount of lateral motion to compensate for dimensional changes in the pivot structure due to thermal expansion.

Figure 6:
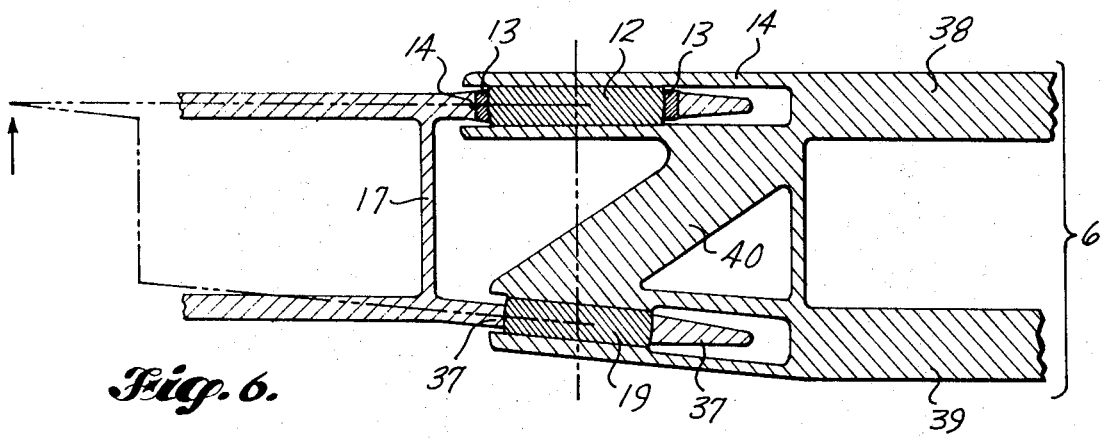
FIG. 6 shows a cross section through the wing pivot of a third embodiment of this invention.

FIG. 6 shows an embodiment in which a dual load path is provided for both the upper and lower bearings. In this embodiment both spherical bearings are carried by the wing yoke 6 and a duplex bearing race similar to that shown in FIG. 5 is attached to the structural members in the movable wing.

Figure 7:
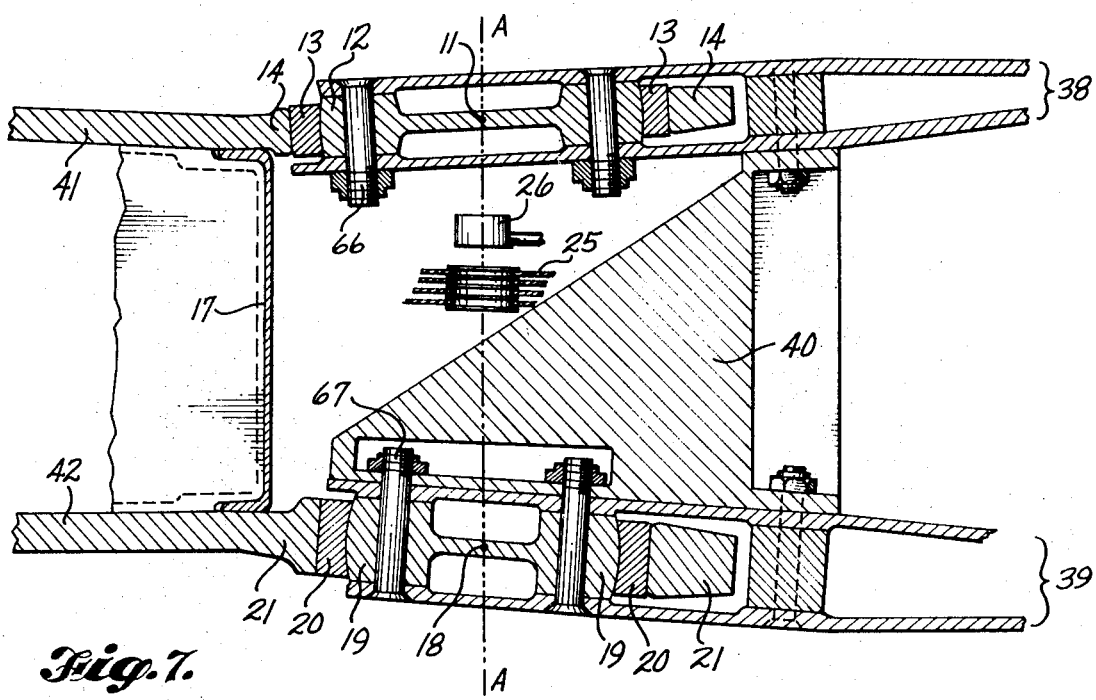
FIG. 7 shows a cross sectional view of the wing pivot shown in FIG. 2 taken along lines 7—7.

The wing pivot shown in FIG. 6 is shown in greater detail in FIG. 7, which depicts a cross section of the wing pivot taken through the pivot axis along line 7—7 of FIG. 2.

In this preferred embodiment, the upper and lower wing supports 38 and 39, respectively, extend outwardly from their connection with the fuselage and are connected together with web 40 to provide the truss arrangement necessary to support the bearing members of this invention and to provide means to handle the occasional shear encountered due to migration of the center of lift of the wing. The spherical bearings 12 and 19 are shown with their centers, 11 and 18 respectively positioned on the wing pivot axis A—A. Control cables 25 and fuel supply apparatus 26 are designed to pivot about the wing pivot axis A—A and are conveniently arranged between bearings 12 and 19. The upper wing member 41 is adapted to carry an outer cylindrical race 14 which in turn carries an inner spherical race 13 encircling the spherical bearing 12. The outer and inner races 14 and 13 respectively are provided so that expansion and contraction from thermal stresses may be accommodated without hindering the operation of the bearing apparatus. Similarly, the lower wing member 42 is adapted to carry an outer cylindrical bearing race 21 but restrained from axial motion which in turn carries an inner spherical bearing race 20 encircling the lower spherical bearing 19. The upper spherical bearing 12 is carried by the upper wing support 38 and is held in position by fasteners 66. The lower spherical bearing member 19 is held in position in the lower wing support 39 by fasteners 67.

Figure 8:
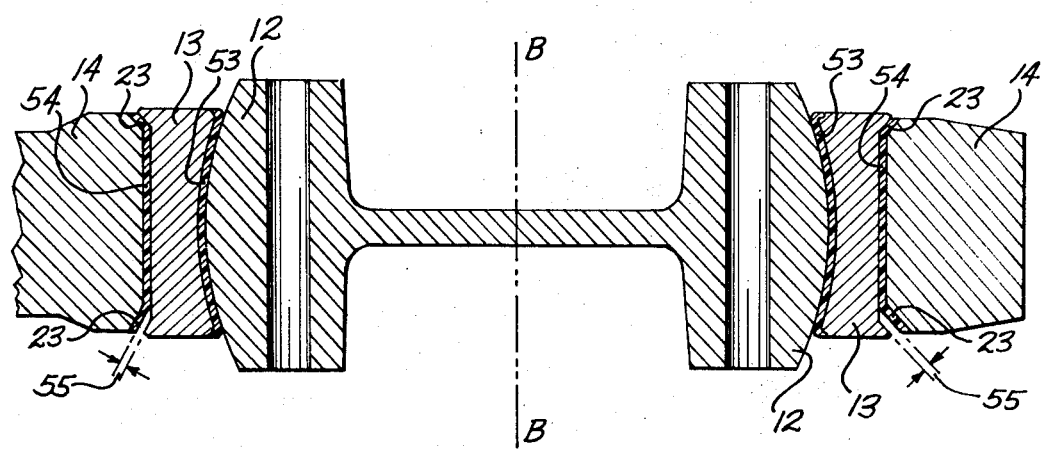
FIG. 8 is a cross section of a combined spherical and cylindrical bearing useful in various embodiments of this invention.

In FIG. 8 a cross section of the bearings preferred for use in this invention is presented to show the structure of the bearing member itself. The spherical bearing member 12 is shown in engagement with the inner spherical bearing race 13. A low-friction bearing material 53 is shown placed between the inner bearing race 13 and the spherical bearing member 12. This material may be a woven Teflon fabric, graphite or Teflon impregnated felt or similar type of low friction material which finds use as a load-bearing material for large, heavily loaded bearing surfaces. Inner race 13 is separated from outer race 14 by a similar material 54 which provides a low friction load-bearing surface between the two bearing races.

Chamfer 23 is provided to restrict translation of the outer race 14 past the inner race 13. Thermal expansion may cause a minor amount of translation between outer race 14 and inner race 13. Any relative movement necessary is accommodated by gap 55.

Conventional drive means may be used to cause the wings of an aircraft equipped with the sweep wing pivot bearing assembly of this invention to move. Examples of suitable drive means would include a rack and pinion drive means, hydraulic cylinders, screw drive and the like. The drive means may conveniently be operably attached to one or both of the structural members in the movable wing which carry the bearing race or spherical bearing or may be attached to any other suitable location to provide an adequate lever arm to move the wing to its several operating positions.

The detailed description presented above is a description of several of the inventors preferred embodiments and presented hereinby way of example. Individuals skilled in the art will find many obvious modifications to this invention as described herein which are within the scope and spirit of this inventon.

I claim as my invention

1. A movable wing aircraft comprising:
   a fuselage;
   a tail section attached to said fuselage;
   movable wings pivotally attached to said fuselage with wing pivot means; said wing pivot means comprising a pair of bearing means, at least one of said bearing means comprising a spherical bearing, said spherical bearing located with its center on said pivot and having its nominal axis noncoincident with the pivot axis of said wing pivot means, and;
   means to cause said movable wings to move from a first, extended position to a second swept position.

2. The apparatus of claim 1 wherein said pair of bearing means comprises two spherical bearings.

3. The apparatus of claim 1 wherein said spherical bearing comprises a spherical inner bearing member, an inner race having a spherical surface mating with said spherical inner bearing member and a cylindrical outer bearing surface, and an outer race having a cylindrical bearing surface adapted to engage the cylindrical outer bearing surface of said inner race, said outer race having means to transmit residual thrust across said wing pivot means.

4. The apparatus of claim 1 wherein one of said pair of bearing means comprises a cylindrical bearing having its axis coincident with the pivot axis of said wing pivot means.

5. The apparatus of claim 3 wherein both of said bearing means are spherical bearings.

6. A wing pivot bearing assembly for aircraft having movable wings comprising: a pair of bearing means pivotally connecting said movable wings with the fuselage of said aircraft, said bearing means each mounted on the pivot axis of said movable wings and at least one of said bearing means having the nominal axis thereof canted with respect to said pivot axis so that planes passing through the center of each bearing perpendicular to the nominal axis thereof will intersect at the approximate center of lift of the wing of said aircraft.

7. The apparatus of claim 6 wherein the bearing having its nominal axis canted with respect to the pivot axis of said movable wing comprises a spherical bearing means.

8. The apparatus of claim 6 wherein both of said pair of bearing means comprises a spherical bearing.

9. The apparatus of claim 6 wherein said bearing having its nominal axis canted with respect to said pivot axis comprises a spherical inner bearing member; an inner race having a spherical surface mating with said spherical inner bearing member for universal rotation therebetween and a cylindrical outer bearing surface; an outer race having a cylindrical bearing surface adapted to engage the cylindrical outer bearing surface of said inner race; said outer race having means to transmit residual thrust across said wing pivot means; means attaching said spherical inner bearing member to the fuselage of said aircraft, and; means attaching said outer race to said movable wings.

10. In an aircraft having movable wings attached to the fuselage of said aircraft, the improvement comprising a wing pivot apparatus having a pair of bearing means attaching said movable wings to said fuselage, at least one of said bearing means comprising a spherical bearing having its nominal axis canted with respect to the pivot axis of said wing pivot apparatus such that planes passing through the center of each of said bearing means and through the center of lift of said wings will intersect the bearing means on a load bearing surface.

11. The apparatus of claim 10 wherein said planes lie perpendicular to the nominal axis of the respective bearing means through which each plane is drawn.

12. An aircraft comprising a fuselage; a pair of movable wings; means to pivotally attach said movable wings to said fuselage; said means to pivotally attach the wings to the fuselage comprising a pair of bearing means, at least one of which is a spherical bearing having its nominal axis non-coincident with the pivot axis of said wing pivot means and comprising a spherical inner bearing member, an inner race having a spherical surface mating with said spherical inner bearing member and a cylindrical outer bearing surface, and an outer race having a cylindrical bearing surface adapted to engage the cylindrical outer bearing surface of said inner race, said outer race having means to transmit residual thrust across said wing pivot means, and; means to cause said movable wings to move from a first extended position to a second swept position.

13. An aircraft comprising a fuselage; a pair of movable wings; means to pivotably attach said movable wings to said fuselage; said means to pivotally attach said wings to the fuselage comprising a pair of bearing means, one of said pair of bearing means being a spherical bearing having its nominal axis non-coincident with the pivot axis of said wing pivot means and the other of said pair of bearing means being a cylindrical bearing having its axis coincident with the pivot axis of said movable wings, and; means to cause said movale wings to move from a first extended position to a second swept position.

References Cited

UNITED STATES PATENTS

| | | | |
|---|---|---|---|
| 3,420,587 | 1/1969 | Straub | 308—72 |
| 3,451,646 | 6/1969 | Aarnaes | 244—46 |
| 3,512,847 | 6/1970 | Link | 244—46X |
| 3,279,721 | 10/1966 | Dethman | 244—46 |

MILTON BUCHLER, Primary Examiner

C. A. RUTLEDGE, Assistant Examiner

U.S. Cl. X.R.

308—72